(12) United States Patent
Yamauchi et al.

(10) Patent No.: US 7,597,995 B2
(45) Date of Patent: Oct. 6, 2009

(54) PRISMATIC BATTERY

(75) Inventors: Yasuhiro Yamauchi, Sumoto (JP);
Naoya Nakanishi, Tokushima (JP);
Toshiyuki Nohma, Kobe (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 11/704,972

(22) Filed: Feb. 12, 2007

(65) Prior Publication Data

US 2007/0196729 A1 Aug. 23, 2007

(30) Foreign Application Priority Data

Feb. 21, 2006 (JP) .............................. 2006-043643

(51) Int. Cl.
*H01M 2/18* (2006.01)
(52) U.S. Cl. .................... 429/130; 429/164; 429/94; 429/254; 428/83
(58) Field of Classification Search .................. 429/94, 429/130, 162, 254; 428/83
See application file for complete search history.

(56) References Cited

U.S. PATENT DOCUMENTS 5,904,999 A * 5/1999 Kimberg et al. ............... 429/27
6,743,546 B1 * 6/2004 Kaneda et al. ............... 429/127
2004/0191612 A1 * 9/2004 Akita et al. ................... 429/94

FOREIGN PATENT DOCUMENTS

JP 2004-303500 A 10/2004

* cited by examiner

*Primary Examiner*—Jane Rhee
(74) *Attorney, Agent, or Firm*—Westerman, Hattori, Daniels & Adrian, LLP.

(57) ABSTRACT

According to an embodiment of the invention, a prismatic battery includes an electrode group 10 contained in a prismatic metal outer can. The electrode group 10 has a positive electrode substrate exposed part 11 at one end and a negative electrode substrate exposed part 12 at the other end. The positive and negative electrode substrate exposed parts 11 and 12 are bundled and welded to positive and negative electrode current collectors 13 and 14, respectively. The positive electrode substrate exposed part 11 and positive electrode current collector 13 and the negative electrode substrate exposed part 12 and negative electrode current collector 14 are covered with an insulating frame 16 having an angled U-shaped cross section and an angled U-shaped outline. It is therefore possible to provide a prismatic battery of a simple structure including an electrode group whose ends are covered with an easily manufactured insulating cover in which the battery's volume energy density is maintained and an internal short circuit is prevented.

9 Claims, 5 Drawing Sheets

PRISMATIC BATTERY

BACKGROUND

1. Technical Field

The present invention relates to a prismatic battery, such as a lithium-ion or alkaline battery. More particularly, the invention relates to a prismatic battery including an electrode group contained in a prismatic metal outer can. The electrode group has a positive electrode substrate exposed part at one end and a negative electrode substrate exposed part at the other end.

2. Related Art

Lithium secondary batteries with high energy density (measured in Wh/Kg) have been developed as power sources for cellular phones, notebook computers, compact camcorders, and other mobile electronics and communications equipment, and for electric vehicles (EVs) and hybrid electric vehicles (HEVs). In particular, prismatic batteries have been attracting attention for their high volume energy density (measured in Wh/l).

A typical method for manufacturing such prismatic batteries can be illustrated as follows. JP-A-2004-303500 is an example of related art. A positive electrode substrate typically made of aluminum foil is coated with a positive electrode mixture containing a positive electrode active material to make a strip positive electrode plate. A negative electrode substrate typically made of copper foil is coated with a negative electrode mixture containing a negative electrode active material to make a strip negative electrode plate. The strip positive and negative electrode plates are placed so as to face each other with a strip separator interposed therebetween to form a multilayer structure. This structure is rolled to make a flattened electrode group and contained in a prismatic metal outer can typically made of aluminum. Then a nonaqueous electrolyte is injected into the can, which completes a prismatic battery.

Figure 5:
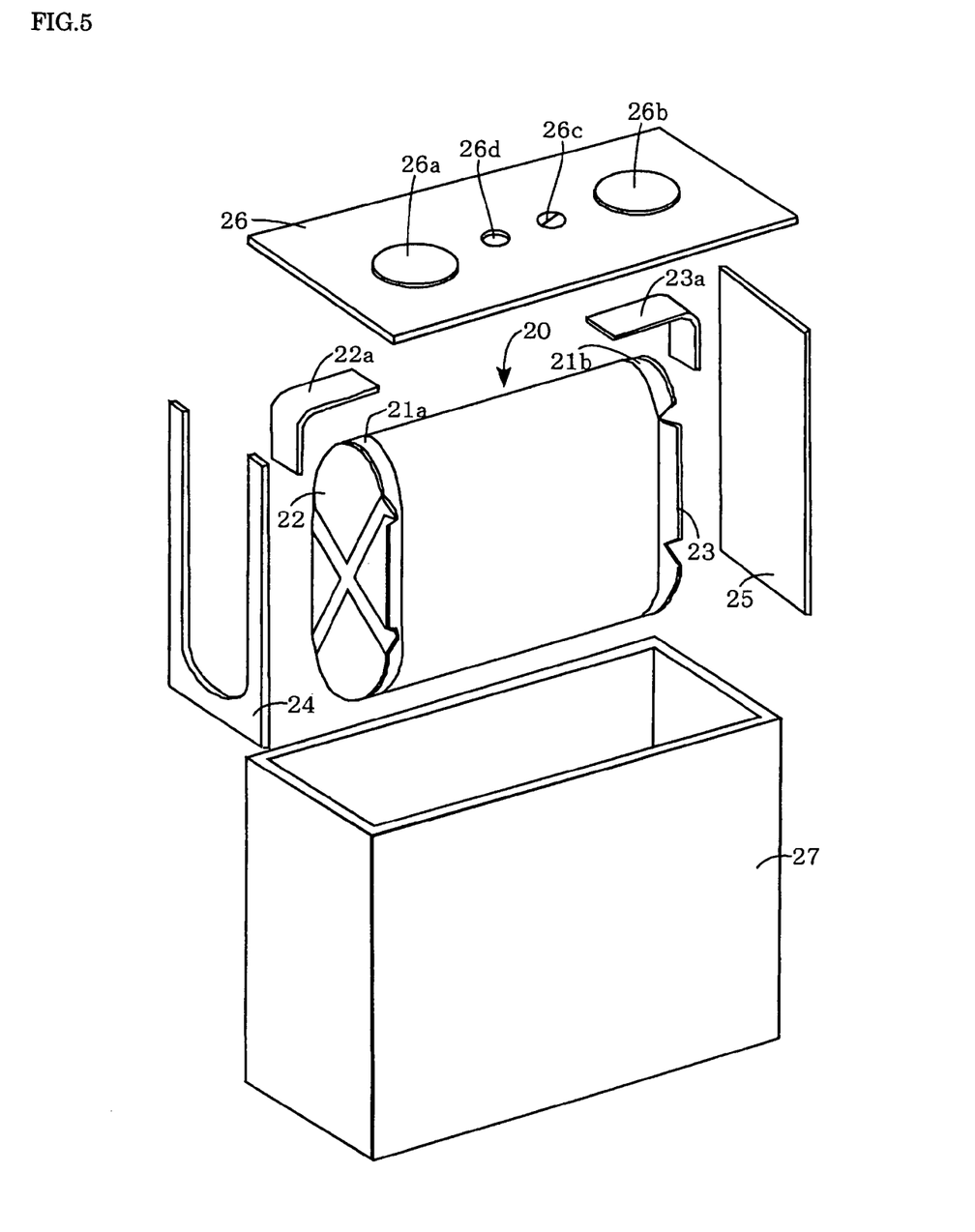
FIG. 5 is an exploded perspective view schematically showing a related-art prismatic battery including a flattened electrode group.

The thus-manufactured flattened electrode group 20, illustrated in FIG. 5, has a positive electrode substrate exposed part 21a (not coated with the positive electrode mixture) extended from the positive electrode plate at one end and a negative electrode substrate exposed part 21b (not coated with the negative electrode mixture) extended from the negative electrode plate at the other end. Welded to the side of the positive electrode substrate exposed part 21a is a positive electrode current collector 22 provided with a welded positive electrode lead 22a. Welded to the side of the negative electrode substrate exposed part 21b is a negative electrode current collector 23 provided with a welded negative electrode lead 23a.

An insulator 24 is placed on the side of the positive electrode current collector 22, while an insulator 25 is placed on the side of the negative electrode current collector 23. Subsequently, the flattened electrode group 20 to which the positive and negative electrode leads 22a and 23a are welded is contained in a prismatic metal outer can 27. The positive electrode lead 22a is welded to the lower end of a positive electrode terminal 26a on a sealing plate 26, while the negative electrode lead 23a is welded to the lower end of a negative electrode terminal 26b. The sealing plate 26 is welded to an opening edge of the metal outer can 27. Then, a predetermined electrolyte is injected from an injection hole 26c on the sealing plate 26 and thereafter the hole 26c is plugged with an injection plug, which completes a prismatic battery. The sealing plate 26 also has a gas vent valve 26d.

With this prismatic battery disclosed in the related art, the positive and negative electrode substrate exposed parts 21a and 21b are exposed at both ends of the flattened electrode group 20. This structure requires a clearance between the sides of the flattened electrode group 20 in its thickness direction and the inner wall of the metal outer can 27 in its thickness direction in order to prevent an internal short circuit between the exposed parts 21a and 21b via the outer can 27. However, providing a clearance that is wide enough to prevent an internal short circuit means extra space in the battery, resulting in an undesirable decrease in the battery's volume energy density.

In addition, since the insulator 24 is simply placed on the side of the positive electrode current collector 22 and the insulator 25 is simply placed on the side of the negative electrode current collector 23, the positive and negative electrode substrate exposed parts 21a and 21b may come in contact with the metal outer can 27, thereby causing an internal short circuit, if the battery falls and the flattened electrode group 20 moves, for example. This short circuit can be prevented by providing an insulating resin tape, for example, to the periphery of the flattened electrode group 20 including the outer surfaces of the insulators 24 and 25 and to the inner wall of the outer can 27.

This however causes another problem. Since the insulating resin tape has low mechanical strength, it may be broken or otherwise damaged when the flattened electrode group 20 provided with this tape is inserted into the metal outer can 27, and as a result, comes in contact with the opening surface of the metal outer can 27. Furthermore, providing this tape at more positions requires more work. In this case, the sides of the positive electrode current collector 22 including the positive electrode substrate exposed part 21a and of the negative electrode current collector 23 including the negative electrode substrate exposed part 21b may be covered by a resin molded piece. This molded piece, however, would be large in size, which increases the cost of parts and makes it difficult to have a reduced thickness, thereby lowering the battery's volume energy density.

SUMMARY

An advantage of some aspects of the invention is to provide a prismatic battery of a simple structure including an electrode group whose ends are covered with an easily manufactured insulating cover, thereby maintaining the battery's volume energy density and preventing an internal short circuit.

According to an aspect of the invention, a prismatic battery includes an electrode group contained in a prismatic metal outer can. The electrode group has a positive electrode substrate exposed part at a first end and a negative electrode substrate exposed part at a second end. The positive and negative electrode substrate exposed parts are bundled and welded to positive and negative electrode current collectors, respectively. The positive electrode substrate exposed part and positive electrode current collector and the negative electrode substrate exposed part and negative electrode current collector are covered with an insulating frame made of a resin sheet having an angled U-shaped cross section and an angled U-shaped outline.

With the positive electrode substrate exposed part and positive electrode current collector and the negative electrode substrate exposed part and negative electrode current collector covered with the insulating frame having an angled U-shaped cross section and outline, the insulating frame protects the periphery of the electrode group, thereby preventing the electrode group from being damaged while it is inserted into the metal outer can. This structure also prevents an internal short circuit. Since the insulating frame made of a resin sheet can be made thin, no extra space is required, thereby increasing the battery's volume energy density.

It is preferable that the insulating frame be bent along two first folding lines in a direction perpendicular to a longitudinal direction of the resin sheet to have an almost angled U-shaped outline, and the insulating frame be bent along two second folding lines in the longitudinal direction of the resin sheet to have an almost angled U-shaped cross section. This structure is simple and easy to manufacture, and therefore the insulating frame is provided economically. It is preferable that the resin sheet for the insulating frame be any one of polypropylene (PP), polyethylene (PE), polyphenylene sulfide (PPS), polyether ether ketone (PEEK), and nylon.

It is therefore possible to provide a prismatic battery including the insulating frame made of a resin sheet having an angled U-shaped cross section and outline provided around the electrode group in which the battery's volume energy density is maintained and internal short circuit is prevented.

BRIEF DESCRIPTION OF THE DRAWINGS

The invention will be described with reference to the accompanying drawings, wherein like numbers reference like elements.

FIGS. 1A to 1C schematically show a flattened electrode group according to one embodiment of the invention.

FIGS. 2A and 2B schematically show an insulating frame according to the present embodiment.

DESCRIPTION OF EXEMPLARY EMBODIMENTS

Figures 1A, 1B, 1C:
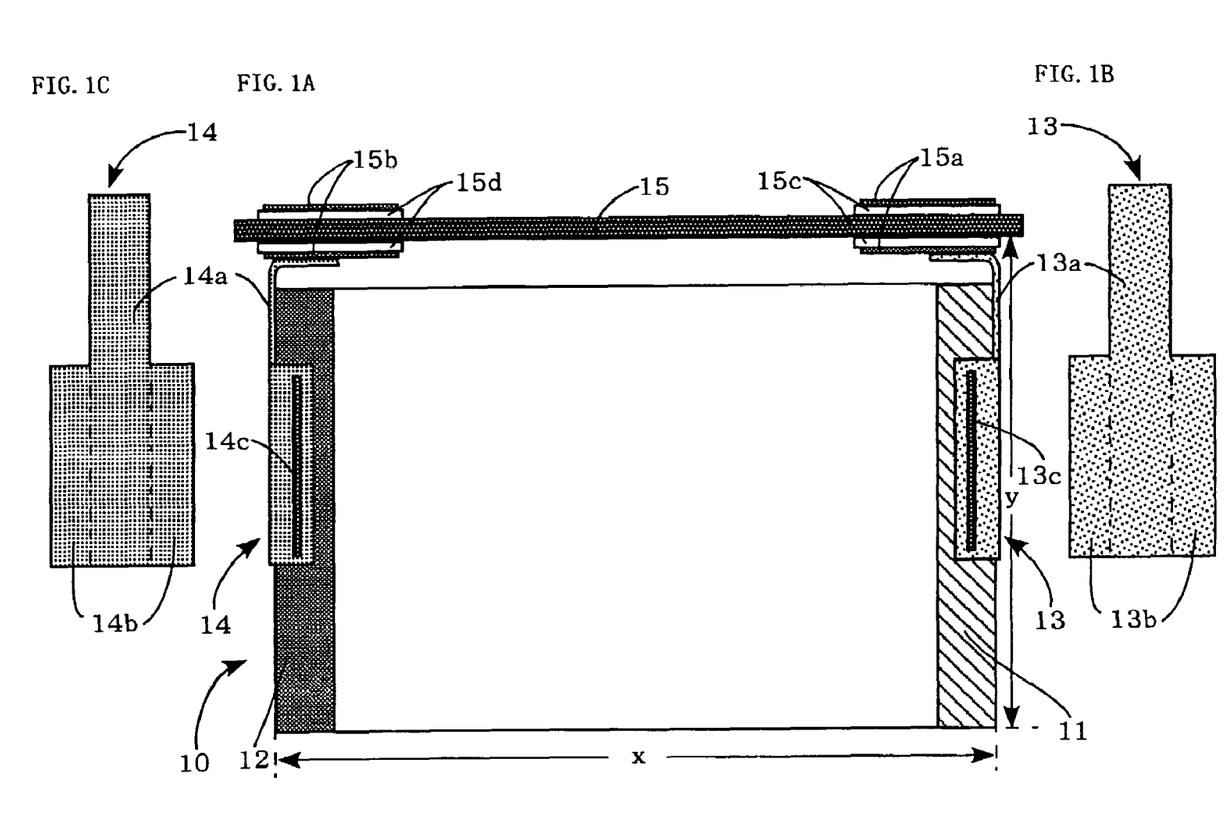
FIG. 1A is a side view schematically showing the flattened electrode group to which a sealing plate is welded at its upper part.
FIG. 1B is a plan view schematically showing a positive electrode current collector.
FIG. 1C is a plan view schematically showing a negative electrode current collector.
Figure 2A:
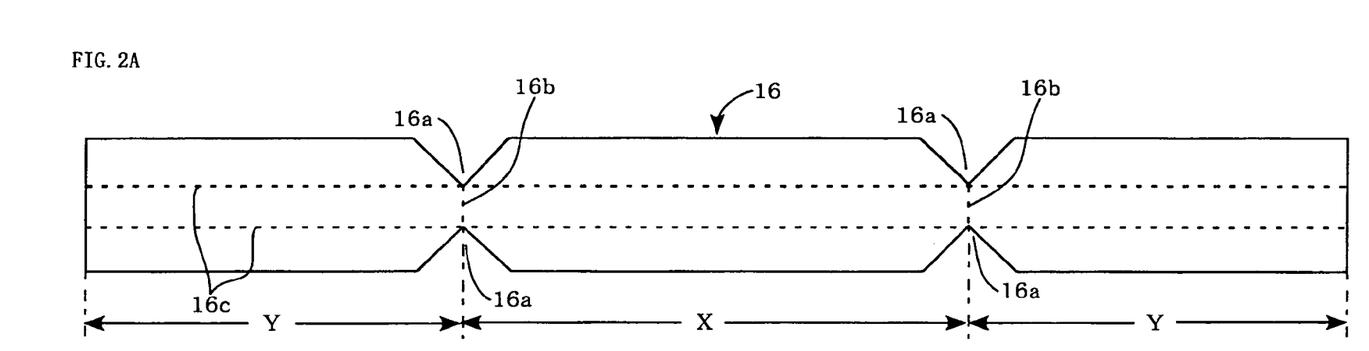
FIG. 2A is a plan view schematically showing a sheet material to be formed into the insulating frame.
Figure 2B:
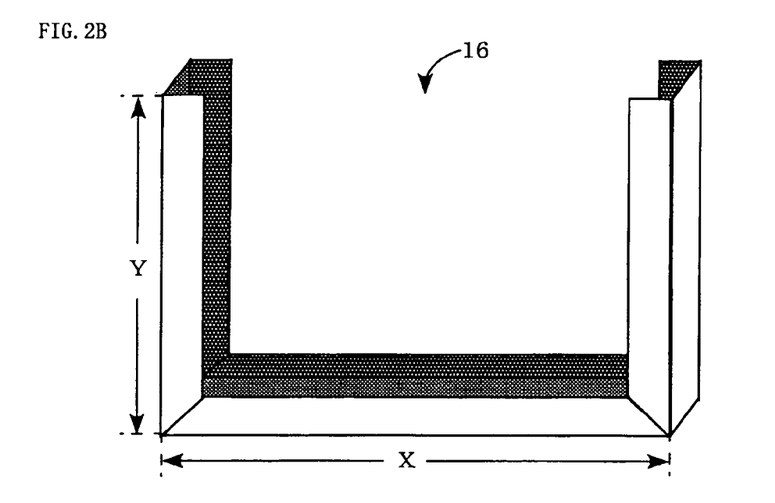
FIG. 2B is a perspective view schematically showing the sheet material bent to form the insulating frame.
Figure 3:
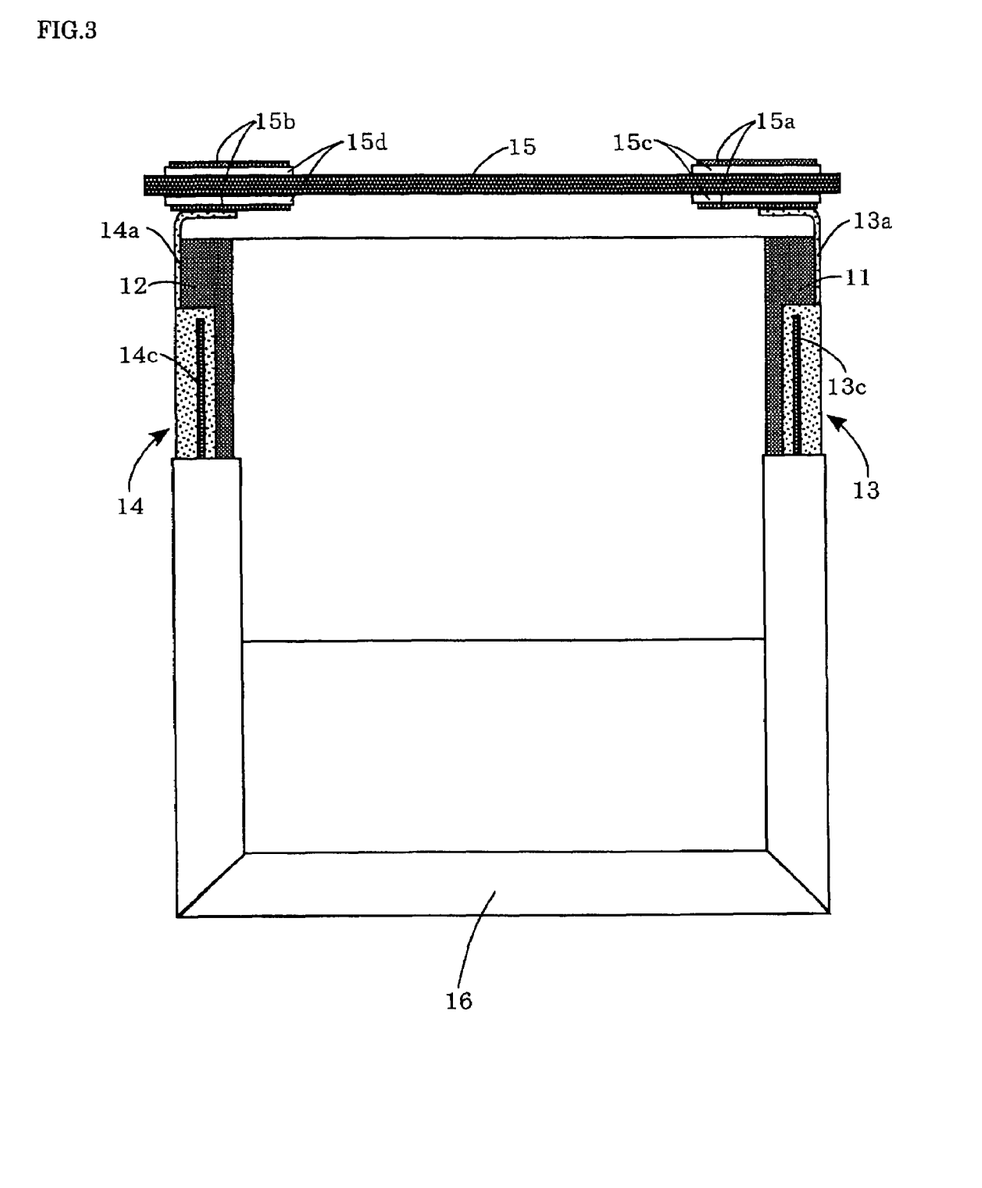
FIG. 3 is a side view schematically showing the flattened electrode group shown in FIG. 1A to which the sealing plate is welded at its upper part is being inserted into the insulating frame shown in FIG. 2.
Figure 4:
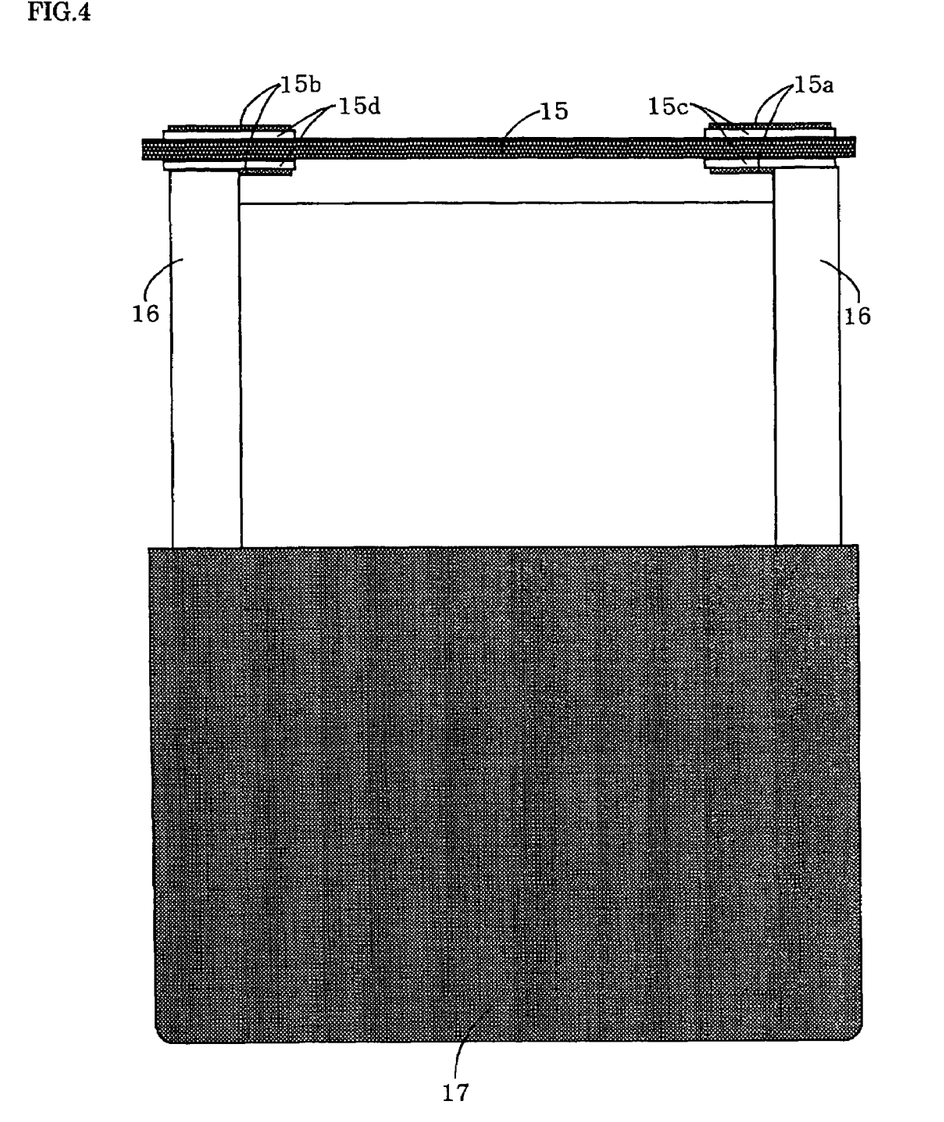
FIG. 4 is a side view schematically showing the flattened electrode group to which the insulating frame is fitted at its periphery and the sealing plate is welded at its upper part is being inserted into an outer can.

An exemplary embodiment of the invention will be described with reference to FIGS. 1 through 4. It should be understood that the embodiment is not intended to limit the invention. Various changes and modifications can be made without departing from the spirit and scope of the invention. FIGS. 1A to 1C show an electrode group according to one embodiment of the invention. FIG. 1A is a side view schematically showing the electrode group to which a sealing plate is welded at its upper part. FIG. 1B is a plan view schematically showing a positive electrode current collector. FIG. 1C is a plan view schematically showing a negative electrode current collector. FIGS. 2A and 2B schematically show an insulating frame according to the present embodiment. FIG. 2A is a plan view schematically showing a sheet material to be formed into the insulating frame. FIG. 2B is a perspective view schematically showing the sheet material bent to form the insulating frame. FIG. 3 is a side view schematically showing the electrode group shown in FIG. 1A to which the sealing plate is welded at its upper part is being inserted into the insulating frame shown in FIG. 2. FIG. 4 is a side view schematically showing the electrode group to which the insulating frame is fitted at its periphery and the sealing plate is welded at its upper part is being inserted into an outer can.

1. Positive Electrode Plate

A positive electrode mixture is prepared by mixing 94% by weight of lithium cobalt oxide ($LiCoO_2$) powders as a positive electrode active material and 3% by weight of carbonaceous powders, such as acetylene black or graphite, as a conductive agent. Separately, a binder solution is prepared by dissolving 3% by weight of a binder of polyvinylidene-fluoride (PVdF) with an organic solvent of N-methyl-2-pyrrolidone (NMP). Then, a positive electrode active material slurry is prepared by mixing and kneading the positive electrode mixture and the binder solution. As the positive electrode active material, $LiCoO_2$ may be replaced with lithium transition metal composite oxides represented by $Li_xMO_2$ (M is at least one of Co, Ni, and Mn; $0.45 \leq x \leq 1.20$), for example one or a combination of two or more of $LiNiO_2$, $LiNi_yCo_{1-y}O_2$ ($0.01 \leq y \leq 0.99$), $Li_{0.5}MnO_2$, and $LiMnO_2$.

A positive electrode substrate made of aluminum foil having a thickness of 20 μm, for example, is prepared. The above-described positive electrode active material slurry is applied evenly to one side of the positive electrode substrate to make a positive electrode mixture layer. Here, the end of the positive electrode mixture layer of a predetermined width (10 mm in this embodiment) is left uncoated with the slurry to make a positive electrode substrate exposed part 11 as shown in FIG. 1. Then, the resultant structure is passed through a dryer to remove an organic solvent (NMP) required for making the slurry. After being dried, the structure is extended to have a thickness of 0.06 mm with a rolling presser to make a strip positive electrode plate. The strip positive electrode plate is then cut out into a 96-mm wide strip, which completes a positive electrode plate having the positive electrode substrate exposed part 11 in a 10-mm wide strip shape.

2. Negative Electrode Plate

A negative electrode active material slurry is prepared by mixing 98% by weight of natural graphite powders as a negative electrode active material and 1% by weight each of carboxymethylcellulose (CMC) and styrene-butadiene rubber (SBR) as binders and then by mixing and kneaded them with water. As the negative electrode active material, natural graphite may be replaced with carbonaceous materials that intercalate and deintercalate lithium ions, such as artificial graphite, carbon black, coke, glassy carbon, carbon fiber, or their calcined substances; metal lithium, lithium-aluminum alloy, lithium-lead alloy, lithium-tin alloy, or other lithium alloys; $SnO_2$, SnO, $TiO_2$, $Nb_2O_3$, or other metal oxides whose potentials are less noble than the positive electrode active material.

A negative electrode substrate made of copper foil having a thickness of 12 μm, for example, is prepared. The above-described negative electrode active material slurry is applied evenly to one side of the negative electrode substrate to make a negative electrode mixture layer. Here, the end of the negative electrode mixture layer of a predetermined width (8 mm in this embodiment) is left uncoated with the slurry to make a negative electrode substrate exposed part 12 as shown in FIG. 1. Then the resultant structure is passed through a dryer. After being dried, the structure is extended to have a thickness of 0.05 mm with a rolling presser to make a strip negative electrode plate. The strip negative electrode plate is then cut out into a 98-mm wide strip, which completes a negative electrode plate having the negative electrode substrate exposed part 12 in an 8-mm wide strip shape.

3. Flattened Electrode Group

The thus-manufactured positive and negative electrode plates are placed on top of each other with a strip separator interposed therebetween in a way that their center lines in the width direction coincide with each other. The strip separator is made of a microporous film that is 0.030 mm thick and 100 mm wide and has a polyethylene-polypropylene-polyethylene trilayer structure. The resultant structure is rolled with a winder and then the circumference is taped to make a rolled electrode group. This electrode group is pushed down to have a flattened cross section to make the flattened electrode group 10. The flattened electrode group 10 has the positive electrode substrate exposed part 11 at one end (on the right of the electrode group 10 shown in FIG. 1A) and the negative electrode substrate exposed part 12 at the other end (on the left of the electrode group 10 shown in FIG. 1A).

Referring to FIG. 1B, a positive electrode current collector 13 made of aluminum having a rectangular body 13a and projecting parts 13b, 13b on both lower sides of the rectangular body, and a negative electrode current collector 14 made of nickel-plated copper having a rectangular body 14a and projecting parts 14b, 14b on both lower sides of the rectangular body are prepared. With the body 13a of the positive electrode current collector 13 pressed against the positive electrode substrate exposed part 11 at one end of the flattened electrode group 10, the projecting parts 13b, 13b are bent and pressed to both sides of the positive electrode substrate exposed part 11, and are irradiated with laser light to laser-weld the positive electrode substrate exposed part 11 and projecting parts 13b, 13b. Accordingly, a laser welded portion 13c is formed in the projecting parts 13b, 13b.

With the body 14a of the negative electrode current collector 14 pressed against the negative electrode substrate exposed part 12 at the other end of the flattened electrode group 10, the projecting parts 14b, 14b are bent and pressed to both sides of the negative electrode substrate exposed part 12, and are irradiated with laser light to laser-weld the negative electrode substrate exposed part 12 and projecting parts 14b, 14b. Accordingly, a laser welded portion 14c is formed in the projecting parts 14b, 14b.

A sealing plate 15 having a positive electrode terminal 15a, a negative electrode terminal 15b, an injection hole, and a gas vent valve (not shown) is prepared. The upper end of the body 13a of the positive electrode current collector 13 is bent and welded to the lower end of the positive electrode terminal 15a, while the upper end of the body 14a of the negative electrode current collector 14 is bent and welded to the lower end of the negative electrode terminal 15b. Accordingly, the sealing plate 15 is placed above the flattened electrode group 10. Here, a resin insulator 15c is provided to insulate between the sealing plate 15 and the positive electrode terminal 15a, and another resin insulator 15d is provided to insulate between the sealing plate 15 and the negative electrode terminal 15b.

4. Insulating Frame

Referring to FIG. 2A, a rectangular sheet material 16 made of polypropylene (PP) having two pairs of V-shaped notches 16a, 16a and 16a, 16a along its longer sides is prepared. The notches of each pair are on opposite sides facing each other. This sheet material is also provided with a pair of first folding lines 16b, 16b between the pairs of the notches 16a, 16a, and a pair of second folding lines 16c, 16c connecting the apexes of the notches 16a, 16a on each side. Here, the length X between the first folding lines 16b, 16b is slightly longer than the length x of the bottom side of the flattened electrode group 10. The length Y from each first folding line 16b to the adjacent end is slightly shorter than the length y from the bottom side of the electrode group 10 to the lower side of the sealing plate 15.

The sheet material 16 is bent inwardly at 90 degrees along the second folding lines 16c, 16c. The sheet material 16 being bent along the second folding lines 16c, 16c is then bent inwardly at 90 degrees along the first folding lines 16b, 16b. Accordingly, an insulating frame 16 having an angled U-shaped cross section and an angled U-shaped outline is formed as shown in FIG. 2B. As a material for the sheet material 16, polypropylene (PP) may be replaced with polyethylene (PE), polyphenylene sulfide (PPS), polyether ether ketone (PEEK), or nylon.

5. Prismatic Nonaqueous Electrolyte Secondary Battery

The flattened electrode group 10 provided with the sealing plate 15 at its upper part is inserted into the insulating frame 16, having an angled U-shaped cross section and outline, from its opening side along its U-shaped outline. Consequently, the positive electrode substrate exposed part 11 and positive electrode current collector 13 and the negative electrode substrate exposed part 12 and negative electrode current collector 14 are covered with the insulating frame 16. This insulating frame 16 protects the periphery of the electrode group 10.

In a mixed solvent prepared by mixing ethylene carbonate (EC) and diethyl carbonate (DEC) in a volume ratio of 3:7, 1 mol/liter of lithium hexafluorophosphate ($LiPF_6$) as an electrolyte is dissolved to prepare a nonaqueous electrolyte. Then the flattened electrode group 10 whose periphery is protected by the insulating frame 16 and whose upper part is provided with the sealing plate 15 is inserted into an aluminum prismatic outer can 17 from its opening. The contact parts of the outer can 17 and the sealing plate 15 are welded for airtight sealing. Then, the above-described nonaqueous electrolyte is injected from an injection hole on the sealing plate 15 and thereafter the hole is plugged with an injection plug, which completes a prismatic nonaqueous electrolyte secondary battery.

As the electrolyte, $LiPF_6$ may be replaced with other lithium salts, such as lithium perchlorate ($LiClO_4$), lithium borofluoride ($LiBF_4$), lithium hexafluoroarsenate ($Li_2AsF_6$), lithium trifluoromethanesulfonate ($LiCF_3SO_3$), bis-trifluoromethane sulfonyl imide lithium $[LiN(CF_3SO_2)_2]$. The amount of the electrolyte to be dissolved in an organic solvent is not limited to 1 mol/liter, and it preferably ranges from 0.5 to 2.0 mol/liter.

According to the present embodiment, the insulating frame 16 having an angled U-shaped cross section and outline covers the positive electrode substrate exposed part 11 and positive electrode current collector 13 and the negative electrode substrate exposed part 12 and negative electrode current collector 14. Since the insulating frame 16 protects the periphery of the flattened electrode group 10, it is possible to prevent the electrode group 10 from being damaged while being inserted into the metal outer can 17. It is therefore possible to further prevent an internal short circuit. Since the insulating frame 16 is made of a resin sheet, it can be made thin and no extra space is required in the outer can 17, thereby increasing the volume energy density of the nonaqueous electrolyte secondary battery.

While the invention is applied to a nonaqueous electrolyte secondary battery in the above-describe embodiment, it is not limited to this. It shall be understood that the invention is also applicable to nickel-hydride storage batteries, nickel-cadmium storage batteries, other alkaline storage batteries, and other types of storage batteries as long as they are prismatic batteries each having an electrode group provided with a positive electrode substrate exposed part at one end and a negative electrode substrate exposed part at the other end and contained in a prismatic metal outer can. In addition, while the rolled electrode group is pushed down to be a flattened electrode group in the above-described embodiment, the invention is applicable to any flattened electrode groups, including an electrode group in which flattened positive and negative electrode plates are placed on top of each other with a separator interposed therebetween.

What is claimed is:

1. A prismatic battery comprising:
   a prismatic metal outer can having an inside surface comprising a first side surface, a second side surface, a third side surface, a fourth side surface, a bottom surface and a top surface, the first side surface being opposed to the third side surface, the second side surface being opposed to the fourth side surface;
   an insulating frame made of a resin sheet, wherein the resin sheet has a first elongated portion, a second elongated portion and a third elongated portion, the first elongated portion being connected with the second elongated portion at a first folding line, the second elongated portion being connected with the third elongated portion at a second folding line, each of the first elongated, the second elongated portion and the third elongated portion having a third folding line to provide a first right peripheral portion, a second right peripheral portion and a third right peripheral portion at a right side of the first elongated portion, the second elongate portion and the third elongated portion, respectively, and each of the first elongated portion, the second elongated portion and the third elongated portion having a fourth folding line to provide a first left peripheral portion, a second left peripheral portion and a third left peripheral portion at a left side of the first elongated portion, the second elongate portion and the third elongated portion, respectively, wherein the first right peripheral portion is separated from the second right peripheral portion by a first notch formed at the first folding line, wherein the second right peripheral portion is separated from the third right peripheral portion by a second notch formed at the second folding line, wherein the first left peripheral portion is separated from the second left peripheral portion by a third notch formed at the first folding line, wherein the second left peripheral portion is separated from the third left peripheral portion by a fourth notch formed at the second folding line, wherein the resin sheet is folded at the first folding line, the second folding line, the third folding line and the fourth folding line to form the insulating frame;
   an electrode group contained in the prismatic metal outer can,
   wherein the first elongated portion is disposed between the first side surface and the electrode group, wherein the second elongated portion is disposed between the bottom surface and the electrode group, wherein the third elongated portion is disposed between the third side surface and the electrode group, wherein the right peripheral portion is disposed between the second side surface and the electrode group, and wherein the left peripheral portion is disposed between the fourth side surface and the electrode group.

2. A prismatic battery according to claim 1, wherein the insulating frame comprises a U-shaped outline, wherein the insulating frame including the first elongated portion and the right and left side portions thereof comprises a first U-shaped cross section, wherein the insulating frame including the second elongated portion and the right and left side portions thereof comprises a second U-shaped cross section, wherein the insulating frame including the third elongated portion and the right and left side portions thereof comprises a third U-shaped cross section.

3. A prismatic battery according to claim 1, wherein the electrode group comprises:
   a positive electrode substrate exposed part; and
   a negative electrode substrate exposed part;
   wherein the positive and negative electrode substrate exposed parts are bundled and welded to positive and negative electrode current collectors, respectively.

4. A prismatic battery according to claim 3, wherein the positive electrode substrate exposed part, the positive electrode current collector, the negative electrode substrate exposed part and the negative electrode current collector are covered with the insulating frame.

5. The prismatic battery according to claim 2, wherein the right and left side portions of the first elongated portion, the second elongated portion and the third elongated portion are bent with respect to the first elongated portion, the second elongated portion and the third elongated portion, respectively.

6. The prismatic battery according to claim 2, wherein the first elongated portion and the third elongated portion are bent with respect to the second elongated portion.

7. The prismatic battery according to claim 1, wherein the resin sheet is made of a material selected from the group consisting of polypropylene, polyethylene, polyphenylene sulfide, polyether ether ketone and nylon.

8. The prismatic battery according to claim 1, wherein the insulating frame is made of a single component.

9. A prismatic battery comprising:
   a prismatic metal outer can having an inside surface comprising a first side surface, a second side surface, a third side surface, a fourth side surface, a bottom surface and a top surface, the first side surface being opposed to the third side surface, the second side surface being opposed to the fourth side surface;
   an insulating frame;
   an electrode group contained in the prismatic metal outer can,
   wherein the insulating frame is made of a resin sheet, wherein the resin sheet has a first elongated portion, a second elongated portion and a third elongated portion, the first elongated portion being connected with the second elongated portion at a first folding line, the second elongated portion being connected with the third elongated potion at a second folding line, wherein each of the first elongated portion, the second elongated portion and the third elongated portion has a third folding line to provide a first right peripheral portion a second right peripheral portion and a third right peripheral portion at a right side of the first elongated portion, the second elongated portion and the third elongated portion, respectively, and each of the first elongated portion, the second elongated portion and the third elongated portion has a fourth folding line to provide a first left peripheral portion, a second left peripheral portion and a third left peripheral portion at a left side of the first elongated portion, the second elongated portion and the third elongated portion, respectively, wherein the first right peripheral portion is separated from the second right peripheral portion by a first notch formed at the first folding line, wherein the second right peripheral portion is separated from the third right peripheral portion by a second notch formed at the second folding line, wherein the first left peripheral portion is separated from the second left peripheral portion by a third notch formed at the first folding line, wherein the second left peripheral portion is separated from the third left peripheral portion by a fourth notch formed at the second folding line, wherein the resin sheet is folded at the first folding line, the second folding line, the third folding line and the fourth folding line to form the insulating frame;

wherein the first elongated portion is disposed between the first side surface and the electrode group, the second elongated portion is disposed between the bottom surface and the electrode group, the third elongated portion is disposed between the third side surface and the electrode group, that the right peripheral portion is disposed between the second side surface and the electrode group, and that the left peripheral portion is disposed between the fourth side surface and the electrode group.

* * * * *